(No Model.)
M. F. WICKLIFFE.
SPECTACLES.
No. 508,457. Patented Nov. 14, 1893.
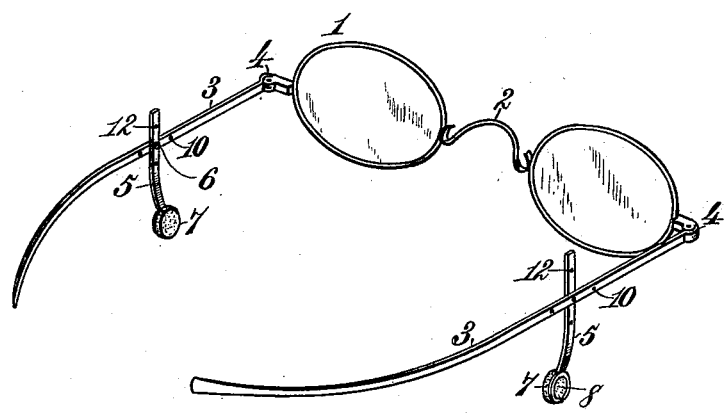
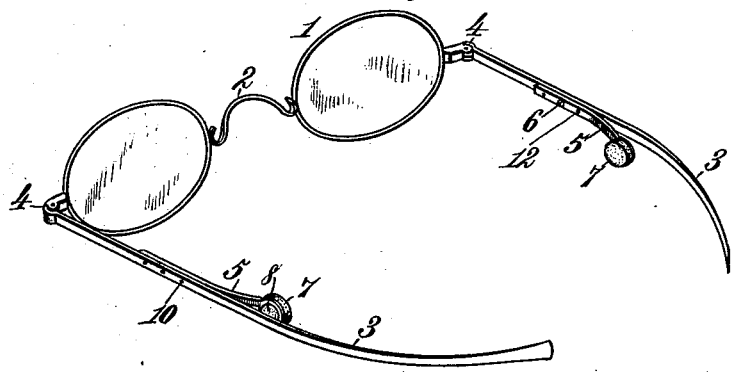
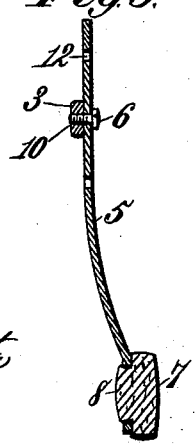
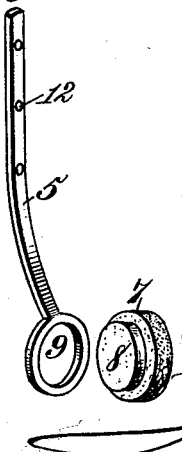
Witnesses.
Robt Everett,
J. A. Saul.
Inventor:
Mary F. Wickliffe.
By James L. Norris.
Atty.
THE NATIONAL LITHOGRAPHING COMPANY,
WASHINGTON, D. C.

UNITED STATES PATENT OFFICE.

MARY FLOURNOY WICKLIFFE, OF LOUISVILLE, KENTUCKY.

SPECTACLES.

SPECIFICATION forming part of Letters Patent No. 508,457, dated November 14, 1893.

Application filed April 21, 1893. Serial No. 471,307. (No model.)

*To all whom it may concern:*

Be it known that I, MARY FLOURNOY WICKLIFFE, a citizen of the United States, residing at Louisville, in the county of Jefferson and State of Kentucky, have invented new and useful Improvements in Spectacles, of which the following is a specification.

In spectacles of ordinary construction the bridge of the lens frame usually bears directly against the nose, causing a painful effect, and frequently abrading the cuticle or producing a discoloration or mark unpleasant to the eye, and often a serious annoyance, especially to those afflicted with catarrh. It has been proposed to provide the bows or temples with housings in which are secured spring plates having laterally curved extremities provided with hard rubber pieces to enter the ears of the wearer for supporting the spectacles, but such construction is objectionable and cumbersome, and renders it inconvenient to insert the spectacles into an ordinary spectacle case, while the spring plates cannot be so folded out of the way as to enable the spectacles to be worn like those of the usual form if such be desired.

The objects of my invention are to avoid the objections stated; to provide novel means whereby spectacles can be worn with the bridge of the lens frame suspended or elevated more or less from contact with the nose; while permitting the spectacles to be compactly folded and inserted into an ordinary spectacle case; and to provide novel means whereby the lens frame can be adjusted relatively to the eyes and firmly sustained in any adjusted position by supports extending from the bows or temples of the lens frame and bearing against portions of the cheeks or the sides of the head of the wearer.

To accomplish all these objects my invention consists essentially in the combination with spectacles, of folding and unfolding arms pivoted directly to the bows or temple pieces between the free extremites thereof and the lens frame, and in proximity to the latter to rest on the cheeks or cheek bones, for supporting the bridge more or less elevated from contact with the nose.

The invention also consists in certain other features of construction and combination or arrangement of parts hereinafter described and claimed, reference being made to the accompanying drawings, in which—

Figure 1 is a perspective view of a pair of spectacles provided with my invention, the pivoted arms being unfolded. Fig. 2 is a similar view showing the pivoted arms folded along the inner sides of the bows or temples. Fig. 3 is a detail sectional view taken through the pivot which connects one of the arms with the bow or temple piece; and Fig. 4 is a detail perspective view of one of the arms with its flexible bearing or pad separated therefrom.

In order to enable those skilled in the art to make and use my invention I will now describe the same in detail, referring to the drawings wherein the numeral 1 indicates the lens frame; 2 the bridge; and 3 the usual bows or temple pieces pivotally connected with the lens frame through the medium of joints 4 of any suitable construction. The bows or temple pieces 3 are each provided with a rest or support, composed of an inelastic arm 5 having one extremity pivotally connected directly to the inner side of the bow or temple piece by a pivot pin 6, and provided at the opposite end with a bearing or pad 7 to rest against the cheek or cheek-bone of the wearer. The bearing or pad is preferably composed of some flexible or comparatively soft material suitable for the conditions required. I prefer to construct the bearing or pad of cork; but do not confine myself thereto, for obviously rubber, felt, or any other soft or flexible material or substance may be employed. The bearing or pad, as here shown, is provided with a short shank or tenon 8, adapted to fit a circular or other suitable orifice 9 in the free extremity of the arm 5. The purpose of the flexible or soft bearing or pad is to avoid discoloring, marking, or abrading the cuticle. The pivot pins 6 are each composed of a small screw extending through one of the arms 5, and in screw-threaded engagement with one of the orifices 10 in the bow or temple piece 3, whereby the arms 5 are susceptible of being removed and replaced or adjusted whenever desired. The bows or temple pieces 3 are each provided with a series of the screw-threaded orifices 10, for the purpose of enabling each pivot or screw 6 to be engaged with any one of said orifices, whereby the point of connection between the arms 5 and the bows or temple pieces 3 can be adjusted along the length of the bows or temple pieces. The pivot screws 6 serve as pivots for the arms 5, and enable the latter to be folded at the inner sides of the bows or temple pieces, or unfolded to extend therefrom, as represented in Fig. 1. The folding and unfolding of the rests or supports are a very desirable feature, in that it enables them to be arranged parallel with the bows or temple pieces, or adjusted to any angle of inclination relatively thereto to suit the conditions required for supporting the lens frame at different elevations with respect to the eyes. In practice the arms 5 are composed of strips of flexible but inelastic metal.

In the practical use of my invention the bearings or pad 7 of the arms 5 are adapted to bear against the cheeks or cheek bones of the wearer, and thereby suspend the bridge of the lens frame free from direct contact with the nose, by which means all pain, or abrading of the skin, or discolorations, or marks, incident to the bridge bearing directly against the nose, are avoided; while by adjusting the arms 5 at a greater or less angle relatively to the bows or temple pieces 3, the position of the lens with relation to the eyes can be largely varied. The pivotal attachments of the rests or supports not only renders them susceptible of folding and unfolding, but enables them to be adjusted for the purpose of supporting the entire lens frame bodily above the eyes, as is frequently desired by those wearing spectacles, and effectually prevents accidental movements of the lens frame.

The arms 5 are each provided along its length with a series of orifices 12, so that the arm can be adjusted on a bow or temple 3 to increase or diminish the distance between the bearing or pad 7 and the pivot or screw 6. By pivoting the ends of the arms to the inner sides of the bows or temples, the arms can be folded so that they lie along the inner sides of the bows or temples, to place them entirely out of the way when the spectacles are to be inserted into their case, or when it is desired to wear the spectacles like those of the usual construction. The invention can be readily applied to spectacles already in use, since it is only essential to provide the bows or temples with orifices to receive the pivot or screw 6. The series of orifices in the arms enable them to be adjusted on the bows or temples to vary the distance between the bearings or pads and the pivotal attachment of the arms to the bows or temples, and the orifices in the latter permit of adjusting the arms along the length thereof, which features of construction are desirable and important, in that they render it possible to fit the parts comfortably to the wearer according as conditions or shape of the head or face may require, whereby the spectacles can be accommodated to any peculiarities that may exist.

Having thus described my invention, what I claim is—

1. The combination with spectacles, of supporting arms, pivoted directly to the inner sides of the bows or temples, between the free extremities thereof and the lens frame, and in proximity to the latter, so that said arms can fold along the inner sides of the bows or temples, and when unfolded are adapted to rest upon the cheeks or cheek bones in proximity to the eyes of the wearer for supporting the bridge of the lens frame free from contact with the nose, substantially as described.

2. The combination with spectacles, of supporting arms, pivoted at one extremity directly to the sides of the bows or temples, between the free extremity thereof and the lens frame, so as to fold along the sides of the bows or temples, and when unfolded are adapted to rest upon the cheeks or cheek bones in proximity to the eyes of the wearer for supporting the bridge of the lens frame free from contact with the nose, substantially as described.

3. The combination with spectacles, of supporting arms, pivoted at one extremity directly to the sides of the bows or temples, and provided at their opposite extremities with soft or flexible bearings or pads, adapted to bear against the cheeks or cheek bones in proximity to the eyes of the wearer for supporting the bridge of the lens frame free from contact with the nose, substantially as described.

4. The combination with spectacles, of folding and unfolding supporting arms, adjustable along the length of the bows or temples, substantially as described.

5. The combination with spectacles, of folding and unfolding supporting arms, pivotally connected with the bows or temples, and provided with bearings or pads, said arms being adjustable along the bows or temples, and also adjustable upon the latter to vary the distance between the pivots of the arms and their bearings or pads, substantially as described.

6. The combination with spectacles, of folding and unfolding supporting arms adjustable along the bows or temples toward and from the lens frame, and also adjustable on said bows or temples to vary the distance between the free extremities of the arms and their point of attachment to the bows or temples, substantially as described.

7. The combination with spectacles, having sides or temples each provided with a series of orifices, of supporting arms having pivot pins adjustable in the orifices, substantially as described.

8. The combination with spectacles, having sides or temples, each provided with a series of orifices, of supporting arms, each provided with a series of orifices, and pivots adapted to engage said orifices for adjusting the arms along the bows or temples, and also on the latter to vary the distance between the pivots and the free extremities of the arms, substantially as described.

In testimony whereof I have hereunto set my hand in presence of two subscribing witnesses.

MARY FLOURNOY WICKLIFFE.

Witnesses:
ALBERT H. NORRIS,
G. W. REA.